UNITED STATES PATENT OFFICE.

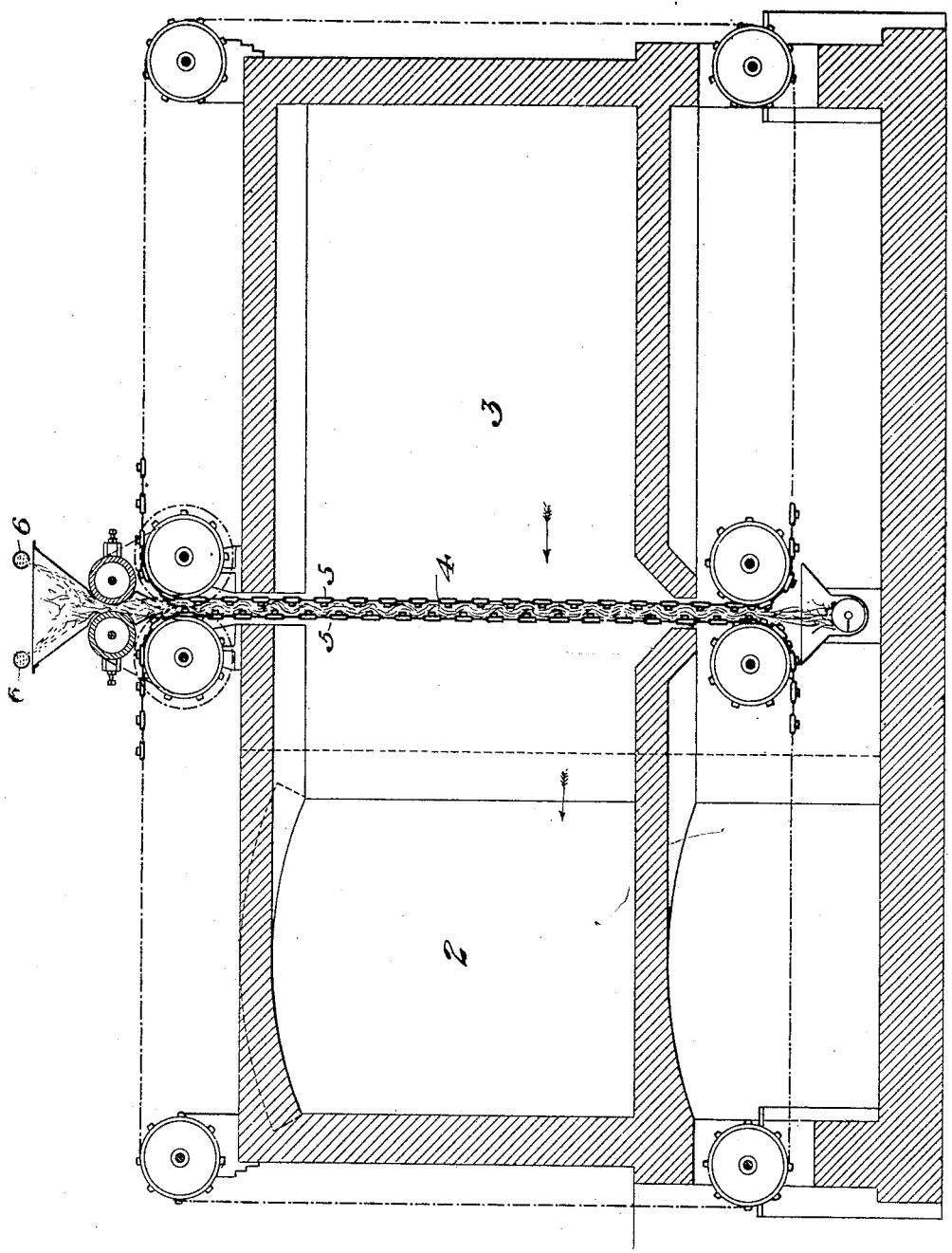

RALPH BAGGALEY, OF PITTSBURG, PENNSYLVANIA.

PROCESS OF RECOVERING SULFUR.

No. 805,701.      Specification of Letters Patent.      Patented Nov. 28, 1905.

Application filed December 26, 1903. Serial No. 186,548.

*To all whom it may concern:*

Be it known that I, RALPH BAGGALEY, of Pittsburg, Allegheny county, Pennsylvania, have invented a new and useful Method of Recovering Sulfur, of which the following is a full, clear, and exact description, reference being had to the accompanying drawing, forming part of this specification, which shows in vertical section apparatus suitable for the preliminary step of my process.

The object of my invention is to recover sulfur from the fumes evolved from any form of chemical or metallurgical furnace in the treatment of ores or mattes containing sulfur; and to that end my invention consists in passing the sulfur-bearing gases from such furnace through a screen of suitable material on which the sulfur is deposited and subsequently subliming and collecting the sulfur from the screen material.

The drawing shows apparatus suitable for the deposit of the sulfur preliminary to subliming it.

2 represents a flue leading from a smelting-furnace for smelting sulfid ores of copper or other metal and communicating with a stack or other means for inducing a draft. In said flue is a chamber 3, through which passes a screen 4, composed of vegetable substance, such as kelp, straw, cactus, branches, or the like.

5 represents mechanism by which the screen is moved, and 6 6 are pipes by which the screen material is wetted with streams of water.

The fumes from the smelter passing through the screen deposit sulfur and other metals and metalloids thereon with rapidity and in great quantity, and when the screen material is withdrawn from the chamber it is ignited, and by its slow combustion it furnishes heat by which the sulfur which has been deposited on the screen material is volatilized and may then be recovered by any of the ordinary processes. My invention, therefore, comprises the collecting of the sulfur on a combustible screen and the burning of the screen as a means of subliming the sulfur.

The advantages of my invention will be appreciated by those skilled in the art.

The present method of producing sulfur is very expensive, so that the present market price of such is about thirty-seven dollars and fifty cents per ton, or one and seven-eighths cents per pound. This is partly due to the fact that ores containing from thirty-five per cent. to fifty-five per cent. of sulfur are purchased at from ten cents to twelve cents per unit of sulfur contained in them, and such ores are then used in the subliming-furnaces as at present used as the original source of the sulfur of commerce. My present invention utilizes for this source of supply a hitherto useless waste product of copper-smelting, which has been not only a waste product, but the cause of great damage, for the escape of such sulfur-fumes into the atmosphere works devastation to the vegetation for many miles distant, and it also pollutes the waters of an entire district, so that both man and beast have been compelled to suffer therefrom.

I claim—

1. The method herein described of obtaining sulfur, which consists in passing sulfur-bearing fumes from a smelting-furnace through a combustible screen and depositing sulfur thereon, and then burning the screen and sublimating and collecting the sulfur; substantially as described.

2. The method herein described of obtaining sulfur, which consists in passing sulfur-bearing fumes from a smelting-furnace through a combustible screen of waste material and depositing sulfur thereon, and then burning the screen and subliming and collecting the sulfur; substantially as described.

3. The continuous method herein described of obtaining sulfur, which consists in passing sulfur-bearing fumes from a smelting-furnace through a traveling combustible screen of waste material and depositing sulfur thereon, and then burning the screen and subliming and collecting the sulfur; substantially as described.

In testimony whereof I have hereunto set my hand.

RALPH BAGGALEY.

Witnesses:
     JOHN MILLER,
     H. M. CORWIN.